United States Patent
Takeda et al.

(10) Patent No.: US 10,945,248 B2
(45) Date of Patent: Mar. 9, 2021

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Liu Liu, Beijing (CN); Huiling Jiang, Beijing (CN); Qin Mu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/543,596

(22) PCT Filed: Jan. 29, 2016

(86) PCT No.: PCT/JP2016/052609
§ 371 (c)(1),
(2) Date: Jul. 14, 2017

(87) PCT Pub. No.: WO2016/121910
PCT Pub. Date: Aug. 4, 2016

(65) Prior Publication Data
US 2018/0014281 A1    Jan. 11, 2018

(30) Foreign Application Priority Data
Jan. 29, 2015  (JP) .............................. JP2015-015163

(51) Int. Cl.
*H04L 12/801* (2013.01)
*H04L 5/14* (2006.01)
(Continued)

(52) U.S. Cl.
CPC ........... *H04W 72/042* (2013.01); *H04J 11/00* (2013.01); *H04W 72/04* (2013.01);
(Continued)

(58) Field of Classification Search
CPC ..... H04W 88/02; H04W 88/04; H04W 76/34; H04W 74/08; H04W 74/0833; H04W 72/044; H04W 72/042; H04W 76/40
See application file for complete search history.

(56) References Cited

U.S. PATENT DOCUMENTS

2012/0195267 A1* 8/2012 Dai .................... H04B 7/06
                                                370/329
2012/0300714 A1* 11/2012 Ng .................... H04W 56/0045
                                                370/329
(Continued)

FOREIGN PATENT DOCUMENTS

EP          3013010 A1      4/2016
WO      2013/185624 A1     12/2013

OTHER PUBLICATIONS

International Search Report issued in corresponding application No. PCT/JP2016/052609 dated Apr. 19, 2016 (4 pages).
(Continued)

*Primary Examiner* — Diane L Lo
*Assistant Examiner* — Abusayeed M Haque
(74) *Attorney, Agent, or Firm* — Osha Bergman Watanabe & Burton LLP

(57) ABSTRACT

The present invention is designed so that communication can be carried out adequately even when the bandwidth to use is limited to partial reduced bandwidths in a system bandwidth. According to an example of the present invention, a user terminal, in which the bandwidth to use is limited to a partial reduced bandwidth in a system bandwidth, has an acquiring section that acquires EPDCCH (Enhanced PDCCH) configuration information based on information that is reported from a radio base station without using a PDCCH (Physical Downlink Control Channel), and a receiving section that detects a user terminal-specific search
(Continued)

space (USS: UE-specific Search Space) of an EPDCCH based on the EPDCCH configuration information.

3 Claims, 19 Drawing Sheets

(51) Int. Cl.

| | | |
|---|---|---|
| H04L 29/06 | (2006.01) | |
| H04L 1/00 | (2006.01) | |
| H04W 72/04 | (2009.01) | |
| H04J 11/00 | (2006.01) | |
| H04W 74/08 | (2009.01) | |
| H04W 76/27 | (2018.01) | |
| H04W 88/02 | (2009.01) | |
| H04W 88/08 | (2009.01) | |

(52) U.S. Cl.
CPC ......... *H04W 72/044* (2013.01); *H04W 74/08* (2013.01); *H04W 74/0833* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2013/0150109 A1* | 6/2013 | Takano | H04W 4/70 455/509 |
| 2013/0272215 A1* | 10/2013 | Khoryaev | H04W 4/06 370/329 |
| 2013/0301549 A1* | 11/2013 | Chen | H04B 7/024 370/329 |
| 2014/0036747 A1* | 2/2014 | Nory | H04W 74/0833 370/311 |
| 2014/0126487 A1* | 5/2014 | Chen | H04L 1/06 370/329 |
| 2014/0192759 A1* | 7/2014 | Son | H04W 72/0426 370/329 |
| 2014/0219204 A1* | 8/2014 | Park | H04L 1/1822 370/329 |
| 2014/0254438 A1 | 9/2014 | Long | |
| 2014/0286277 A1 | 9/2014 | Jang et al. | |
| 2014/0334403 A1* | 11/2014 | Park | H04L 27/2647 370/329 |
| 2014/0376460 A1* | 12/2014 | Hooli | H04L 5/0053 370/329 |
| 2015/0009874 A1* | 1/2015 | Edara | H04W 76/28 370/311 |
| 2015/0023281 A1* | 1/2015 | Wu | H04W 72/0473 370/329 |
| 2015/0092735 A1* | 4/2015 | Xu | H04W 72/042 370/329 |
| 2015/0146629 A1* | 5/2015 | Ranta-aho | H04L 5/0053 370/329 |
| 2015/0341818 A1* | 11/2015 | Han | H04W 72/005 370/252 |
| 2016/0043849 A1* | 2/2016 | Lee | H04W 72/042 370/329 |
| 2016/0087781 A1* | 3/2016 | Eriksson | H04L 1/1812 370/280 |
| 2016/0127097 A1* | 5/2016 | Chen | H04L 5/0051 370/330 |
| 2016/0135145 A1* | 5/2016 | Tirronen | H04W 72/1268 370/336 |
| 2016/0143009 A1 | 5/2016 | Zhang | |
| 2016/0219626 A1* | 7/2016 | Martin | H04W 28/0221 |
| 2017/0164137 A1* | 6/2017 | Duval | H04W 4/70 |

OTHER PUBLICATIONS

Witten Opinion of the International Searching Authority issued in corresponding application No. PCT/JP2016/052609 dated Apr. 19, 2016 (4 pages).
Intel Corporation, "Discussion on data and control channel enhancements for eMTC"; 3GPP TSG RAN WG1 Meeting #78bis, R1-143771; Ljubljana, Slovenia; Oct. 6-10, 2014 (6 pages).
Catt, "Considerations on E-PDCCH search space design"; 3GPP TSG RAN WG1 Meeting #68bis, R1-121102; Jeju, Korea; Mar. 26-30, 2012 (3 pages).
Sony, "Views on PDSCH buffering options for low-complexity MTC UEs"; 3GPP TSG RAN WG1 Meeting #76bis, R1-141567; Shenzhen, P.R. China; Mar. 31-Apr. 4, 2014 (7 pages).
Huawei, HiSilicon, "Downlink control channel design for MTC UEs"; 3GPP TSG RAN WG1 Meeting #78bis, R1-143717; Ljubljana, Slovenia; Oct. 6-10, 2014 (6 pages).
InterDigital, "RAR and Paging for Rel-13 MTC"; 3GPP TSG RAN WG1 Meeting #79, R1-145050; San Francisco, USA; Nov. 17-21, 2014 (3 pages).
3GPP TS 36.300 V8.5.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); May 2008 (134 pages).
3GPP TR 36.888 V12.0.0, "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
Office Action issued in corresponding Japanese Patent Application No. 2016-572169, dated Oct. 31, 2017 (4 pages).
Extended European Search Report issued in the counterpart European Patent Application No. 16743513.0, dated Aug. 21, 2018 (12 pages).
Huawei, HiSilicon; "Control-less transmission of common messages for low complexity Rel-13 UEs"; 3GPP TSG RAN WG1 Meeting #79 R1-144583, San Francisco, USA, Nov. 17-21, 2014 (3 pages).
NTT Docomo; "Consideration on EPDCCH for low cost MTC"; 3GPP TSG RAN WG1 Meeting #79 R1-144963; San Francisco, USA, Nov. 17-21, 2014 (4 pages).
Huawei, HiSilicon; "Control-centric transmission of common messages for Rel-13 UEs"; 3GPP TSG RAN WG1 Meeting #79 R1-145101; San Francisco, USA, Nov. 17-21, 2014 (3 pages).
Alcatel-Lucent, Alcatel-Lucent Shanghai Bell; "Coverage enhancement for (E)PDCCH"; 3GPP TSG-RAN WG1 Meeting #76 R1-140154; Prague, Czech Republic, Feb. 10-14, 2014 (5 pages).
Office Action issued in counterpart European Patent Application No. 16743513.0, dated Feb. 25, 2019 (5 Pages).
Office Action issued in European Application No. 16743513.0, dated Jun. 4, 2020 (4 pages).
Office Action issued in the counterpart Chinese Patent Application No. 201680007707.2, dated Sep. 27, 2020 (13 pages).

\* cited by examiner

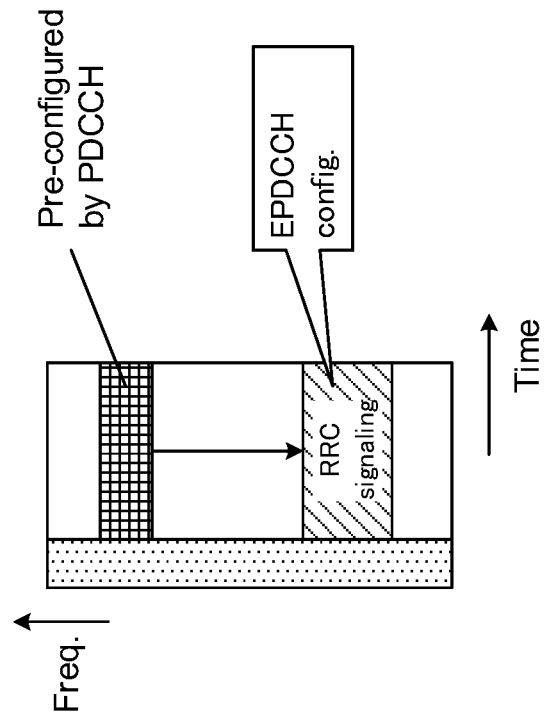
FIG. 2A
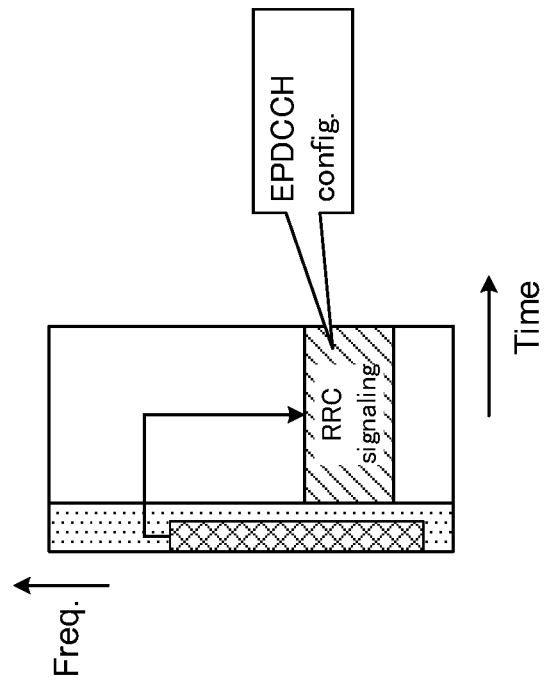
FIG. 2B

| Set ID | Tx type | Number of RB | RB assignment | DM-RS scrambling sequence ID | PUCCH start offset |
|---|---|---|---|---|---|
| 1 bit | 1 bit | 3 bits | 4~38 bits | 9 bits | 11 bits |

FIG. 10

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, successor systems of LTE (also referred to as, for example, "LTE-advanced" (hereinafter referred to as "LTE-A"), "FRA" (Future Radio Access) and so on) are under study for the purpose of achieving further broadbandization and increased speed beyond LTE.

Now, accompanying the cost reduction of communication devices in recent years, active development is in progress in the field of technology related to machine-to-machine communication (M2M) to implement automatic control of network-connected devices and allow these devices to communicate with each other without involving people. In particular, of all M2M, 3GPP (3rd Generation Partnership Project) is promoting standardization with respect to the optimization of MTC (Machine-Type Communication), as a cellular system for machine-to-machine communication (see non-patent literature 2). MTC terminals (MTC UE (User Equipment)) are being studied for use in a wide range of fields, such as, for example, electric meters, gas meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Non-Patent Literature 2: 3GPP TS 36.888 "Study on provision of low-cost Machine-Type Communications (MTC) User Equipments (UEs) based on LTE (Release 12)"

SUMMARY OF INVENTION

Technical Problem

From the perspective of reducing the cost and improving the coverage area in cellular systems, amongst all MTC terminals, low-cost MTC terminals (LC-MTC UEs) that can be implemented in simple hardware structures have been increasing in demand. Low-cost MTC terminals can be implemented by limiting the uplink (UL) bandwidth and the downlink (DL) bandwidth to use to part of a system bandwidth. A system bandwidth is equivalent to, for example, an existing LTE bandwidth (for example, 20 MHz), a component carrier (CC) and so on.

When the bandwidth to use is limited to part of a system bandwidth, it is not possible to receive wide-bandwidth channels (for example, the PDCCH (Physical Downlink Control Channel)) and signals that are used in existing systems. So, a study is in progress to use the EPDCCH (Enhanced Physical Downlink Control Channel), instead of the PDCCH, for user terminals (for example, MTC terminals) where the bandwidth to use is limited to reduced bandwidths.

Existing user terminals acquire EPDCCH configuration information ("EPDCCH config."), which relates to EPDCCH allocation resources and so on, from the PDCCH, directly or indirectly. However, user terminals, in which the bandwidth to use is limited to reduced bandwidths, cannot use the PDCCH, and it then follows that these user terminals cannot acquire EPDCCH configuration information and cannot communicate adequately.

The present invention has been made in view of the above, and it is therefore an object of the present invention to provide a user terminal, a radio base station and a radio communication method, whereby communication can be carried out adequately even when the bandwidth to use is limited to partial reduced bandwidths in a system bandwidth.

Solution to Problem

According to one aspect of the present invention, a user terminal, in which the bandwidth to use is limited to a partial reduced bandwidth in a system bandwidth, has an acquiring section that acquires EPDCCH (Enhanced PDCCH) configuration information based on information that is reported from a radio base station without using a PDCCH (Physical Downlink Control Channel), and a receiving section that detects a user terminal-specific search space (USS: UE-specific Search Space) of an EPDCCH based on the EPDCCH configuration information.

Advantageous Effects of Invention

According to the present invention, communication can be carried out adequately even when the bandwidth to use is limited to partial reduced bandwidths in a system bandwidth.

BRIEF DESCRIPTION OF DRAWINGS

FIG. 2 provide diagrams to explain the method of acquiring EPDCCH configuration information in conventional LTE systems;

FIG. 10 is a diagram to show an example of the amount of information that is needed to report EPDCCH configuration information;

DESCRIPTION OF EMBODIMENTS

Studies are in progress to simplify the hardware structures of low-cost MTC terminals at the risk of lowering their processing capabilities. For example, studies are in progress to lower the peak rate, limit the transport block size, limit the resource blocks (also referred to as "RBs," "PRBs" (Physical Resource Blocks), and so on), and limit the RFs to receive, and so on, in low-cost MTC terminals, in comparison to existing user terminals (LTE terminals).

Low-cost MTC terminals may be referred to simply as "MTC terminals." Also, existing user terminals may be referred to as "normal UEs," "non-MTC UEs," "category 1 UEs" and so on.

Unlike existing user terminals, in which the system bandwidth (for example, 20 MHz, one component carrier, etc.) is the upper limit bandwidth for use, the upper limit bandwidth for use for MTC terminals is limited to predetermined reduced bandwidths (for example, 1.4 MHz). Studies are in progress to operate such band-limited MTC terminals in an LTE system bandwidth, considering the relationship with existing user terminals. For example, in a system bandwidth, frequency-multiplexing of band-limited MTC terminals and band-unlimited existing user terminals is supported. Consequently, MTC terminals may be seen as terminals in which the maximum bandwidth to be supported is a partial reduced bandwidth in a system bandwidth, or may be seen as terminals which have the functions for transmitting/receiving in narrower bandwidths than an LTE system bandwidth.

Figure 1:
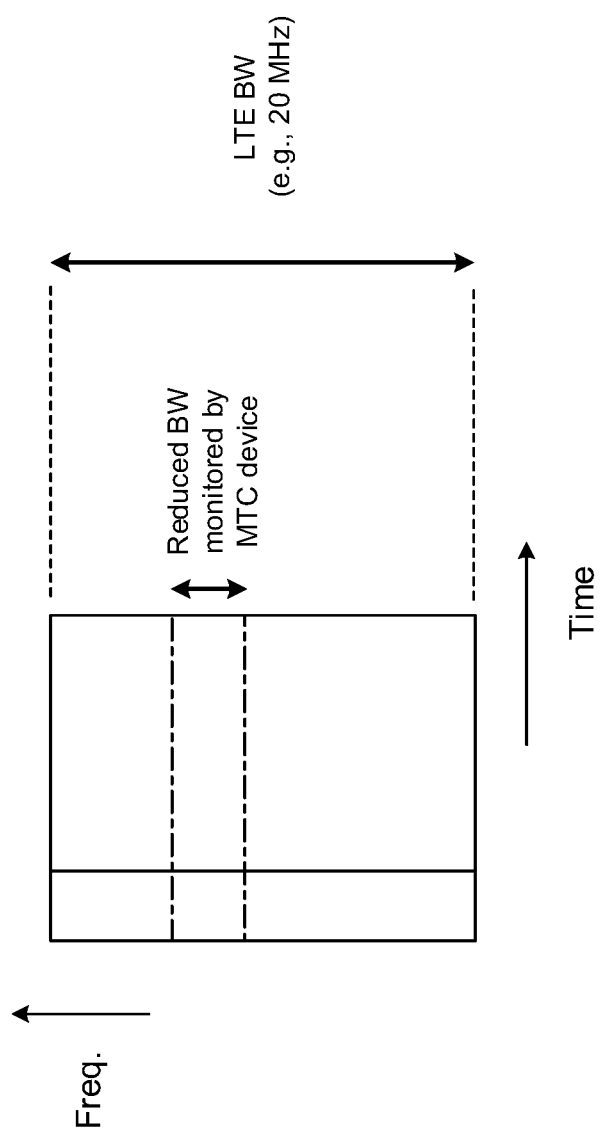
FIG. 1 is a diagram to show an example of the arrangement of reduced bandwidths in a system bandwidth.

FIG. 1 is a diagram to show an example of the arrangement of reduced bandwidths in a system bandwidth. FIG. 1 shows that a predetermined reduced bandwidth, which is narrower than an LTE system bandwidth (for example, 20 MHz), is the range to be detected by MTC terminals.

Note that it is preferable to employ a structure, in which, in a system bandwidth, the frequency location of a reduced bandwidth to serves as a bandwidth for use by MTC terminals can be changed. For example, MTC terminals should preferably communicate by using different frequency resources per predetermined period (for example, per subframe). By this means, it is possible to achieve traffic offloading for MTC terminals, achieve a frequency diversity effect, and reduce the decrease of spectral efficiency. Consequently, considering the application of frequency hopping, frequency scheduling and so on, MTC terminals should preferably have an RF re-tuning function.

Now, MTC terminals only support communication in a reduced bandwidth in a given period, and therefore MTC terminals are unable to detect downlink control information (DCI) that is transmitted in a PDCCH of a wide bandwidth. So, a study is in progress to allocate downlink data (PDSCH: Physical Downlink Shared Channel) and uplink data (PUSCH: Physical Uplink Shared Channel) resources to MTC terminals by using an EPDCCH.

Here, the mode of use of an EPDCCH in conventional LTE systems (for example, LTE Rel-11/12) will be described. An EPDCCH is arranged to be frequency-multiplexed in a PDSCH radio resource location. An EPDCCH can be formed with a plurality of PRBs, and may be referred to as an "EPDCCH set" (EPDCCH-PRB-set). Furthermore, as candidates for an EPDCCH to allocate to a user terminal, one or a plurality of EPDCCHs configured. In a specified subframe, a user terminal monitors a user terminal-specific search space (USS), which is formed with the candidate EPDCCH set.

To detect the EPDCCH, the user terminal has to acquire EPDCCH configuration information (EPDCCH config.). The EPDCCH configuration information contains information about a predetermined EPDCCH set, including, for example, the type of transmission, the number of RBs, the allocation of RBs, the initialization parameter of the DM-RS (Demodulation Reference Signal) scrambling sequence and so on.

In conventional LTE systems, a user terminal receives RRC signaling based on the PDCCH, and, by this means, acquires the EPDCCH configuration information included in this RRC signaling. FIG. 2 provide diagrams to explain the method of acquiring EPDCCH configuration information in conventional LTE systems. In FIG. 2A, a user terminal receives RRC signaling with reference to the DCI included in the PDCCH. Furthermore, in FIG. 2B, a user terminal receives RRC signaling with reference to a user terminal-specific EPDCCH that is configured in advance by the PDCCH.

Figure 3:
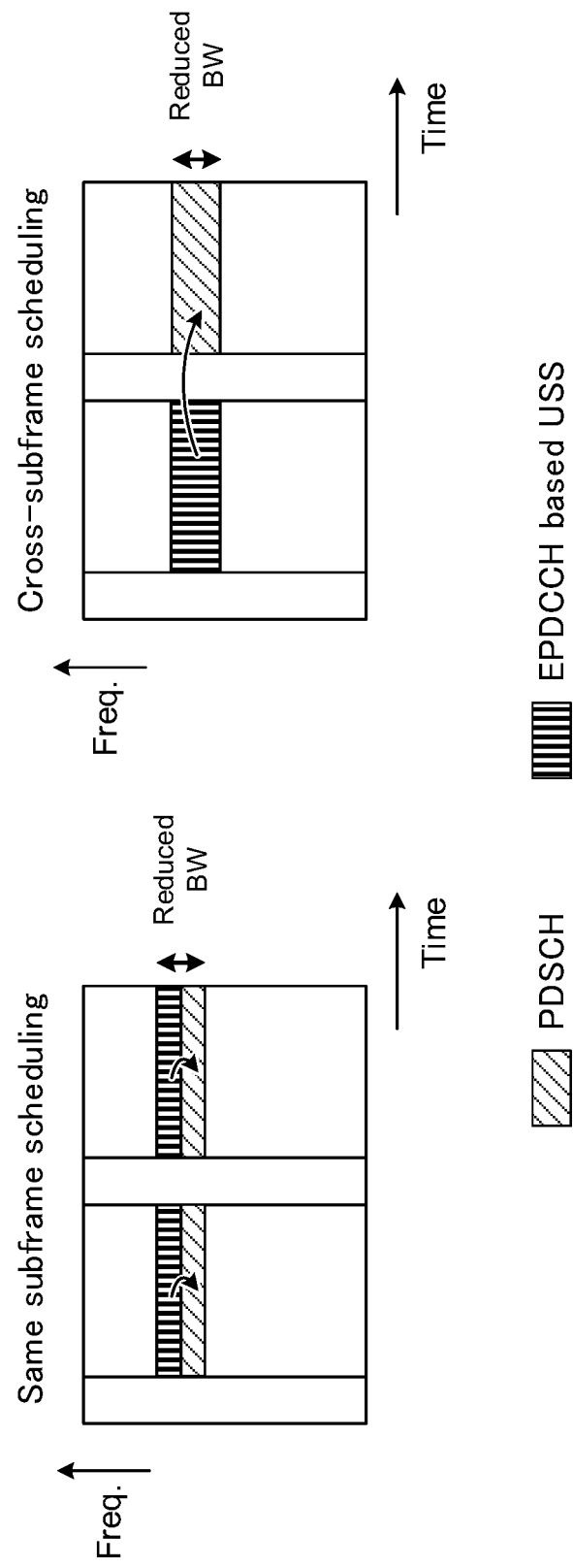
FIG. 3 is a diagram to show examples of PDSCH allocation in an MTC terminal.

An MTC terminal may use an USS-based EPDCCH like an existing user terminal does. FIG. 3 is a diagram to show examples of PDSCH allocation in an MTC terminal. FIG. 3 shows the case where an EPDCCH is used to schedule the PDSCH in the same subframe (same subframe scheduling), and the case where an EPDCCH is used to schedule the PDSCH in a different subframe (cross-subframe scheduling). In this way, by using an USS-based EPDCCH, it is possible to control the allocation of data signals flexibly even in MTC terminals.

However, as mentioned earlier, MTC terminals cannot use the PDCCH, and therefore conventional methods of acquiring EPDCCH configuration information, such as those illustrated in FIG. 2, cannot be employed. Consequently, there is a threat that MTC terminals cannot communicate adequately by using an EPDCCH.

As a simple solution, although the EPDCCH set to use may be determined and configured in advance, the scheduling becomes less free in this case, which then disables flexible control. For example, when a plurality of MTC terminals that belong to different cells use EPDCCH in the same radio resource, there is a threat that interference may be produced. Consequently, when an EPDCCH USS cannot be configured freely, communication cannot be carried out adequately.

So, the present inventors have come up with the idea of allowing radio base stations and/or MTC terminals to identify EPDCCH configuration information for USS explicitly or implicitly, and thereupon arrived at the present invention. According to each example of the present invention, a radio base station can report EPDCCH configuration information for USS, to a user terminal, without using an existing PDCCH. By this means, it becomes possible to control the allocation of an EPDCCH flexibly. Note that, when it is mentioned that a PDCCH is not used, this means that EPDCCH configuration information is not acquired by using a PDCCH directly or indirectly, unlike FIG. 2A and FIG. 2B.

Now, embodiment of the present invention will be described below in detail. Although MTC terminals will be shown as an example of user terminals in which the bandwidth to use is limited to reduced bandwidths, the application of the present invention is not limited to MTC terminals. Furthermore, although 6-PRB (1.4-MHz) reduced bandwidths will be described below, the present invention can be applied to other reduced bandwidths as well, based on the present description. Note that an EPDCCH USS (EPDCCH UE-specific Search Space) may be referred to as an "eUSS" (enhanced USS).

First Embodiment

A method to allow a radio base station (eNB) to send an explicit report of EPDCCH configuration information for USS to an MTC terminal (UE) without using the existing PDCCH will be described with a first embodiment the present invention.

Note that, based on the EPDCCH configuration information for USS included in the explicit report, the UE may detect an EPDCCH in the next subframe after the report is received, detect an EPDCCH within a predetermined period after the report is received (for example, within several subframes), or detect an EPDCCH in a predetermined period that comes a certain period after the report is received.

<Method 1>

In method 1 according to the first embodiment, when a common search space (CSS) is configured in an EPDCCH, a UE acquires EPDCCH configuration information for USS based on the CSS of the EPDCCH. Note that an EPDCCH CSS (EPDCCH Common Search Space) may be referred to as an "eCSS" (enhanced CSS).

Figure 4A:
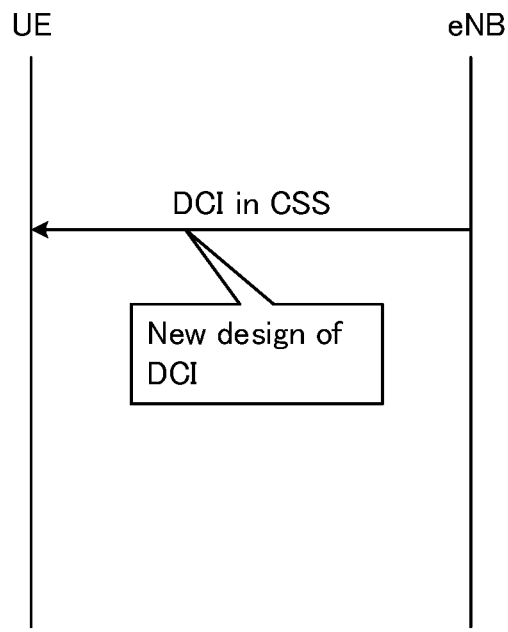
FIG. 4 provide diagrams to show examples of EPDCCH configuration information according to method 1 of a first embodiment.

FIG. 4 provide diagrams to show examples of EPDCCH configuration information according to method 1 of the first embodiment. FIG. 4A is a diagram to show an EPDCCH configuration information report included in DCI. As shown in FIG. 4A, in method 1, DCI to include EPDCCH configuration information is reported in the EPDCCH CSS. Note that, information related to the EPDCCH CSS (for example, EPDCCH configuration information for CSS) may be determined in advance or may be configured in advance. For example, the information related to the EPDCCH CSS may be configured by the MIB (Master Information Block) and/or SIBs (System Information Block), which provide broadcast information.

Here, the DCI that carries EPDCCH configuration information in the CSS is scrambled by using, for example, user terminal-specific information (for example, C-RNTI (Cell-Radio Network Temporary Identifier), UEID (User Equipment Identifier) and so on) pertaining to specific UEs. Consequently, although the CSS allows all UEs to receive this DCI, only the specific UEs corresponding to the specific information can decode the DCI.

Figure 4B:
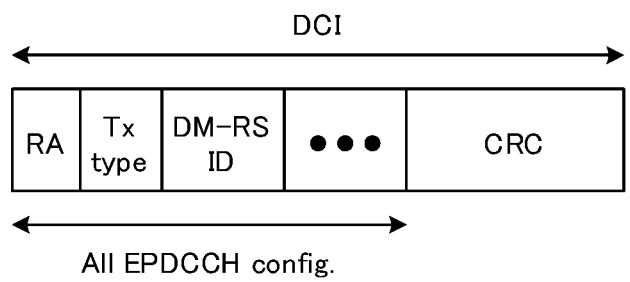
Figure 4C:
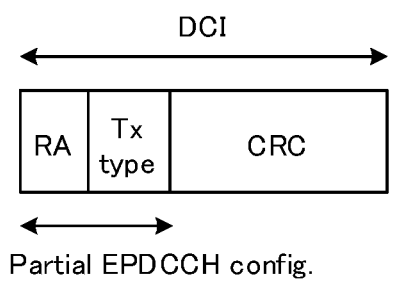

FIG. 4B and FIG. 4C each show an example of EPDCCH configuration information included in DCI. DCI may be structured to contain all EPDCCH configuration information (all EPDCCH config.) (FIG. 4B), or may be structured to contain partial EPDCCH configuration information (partial EPDCCH config.) (FIG. 4C). Here, all EPDCCH configuration information may refer to all the parameters that may be contained in EPDCCH-Config. information elements reported in RRC signaling in existing LTE systems, but this is by no means limiting.

Furthermore, although FIG. 4C shows a case where resource assignment (RA) and transmission type (Tx type) are contained as partial EPDCCH configuration information, the combination of partial EPDCCH configuration information to be included in DCI is by no means limited to this.

DCI includes CRC (Cyclic Redundancy Code). CRC is generated by using user terminal-specific information (for example, the C-RNTI).

Note that the EPDCCH configuration information may contain different parameters from those contained in the EPDCCH-Config. information elements of existing LTE systems. For example, RA needs not be information to be designated per RB, and can be information that specifies frequencies per reduced bandwidth (for example, per 1.4 MHz). Furthermore, EPDCCH configuration information for dedicated use for MTC terminals, such as information about frequency hopping, the number of times to repeat transmission and so on, with respect to an EPDCCH, may be included.

As shown in FIG. 4C, a structure may be employed here in which, when partial EPDCCH configuration information is reported, the rest of the EPDCCH configuration information is configured in advance. Furthermore, when EPDCCH configuration information that is already configured is reported, a UE may update the EPDCCH configuration information. For example, after all EPDCCH configuration information is reported as shown in FIG. 4B, if, then, partial EPDCCH configuration information (the resource assignment and the transmission type) is received as shown in FIG. 4C, the resource assignment and the transmission type may be updated based on the new information.

Note that, as for the DCI of method 1, it is possible to use DCI (format 1A, 1C and so on) in existing systems, enhance DCI of existing systems, or define new DCI for dedicated use for MTC terminals.

As described above, according to method 1, the EPDCCH CSS can be detected by all UEs, and therefore a UE can easily acquire EPDCCH configuration information for USS. Furthermore, since EPDCCH resources can be configured on a per UE basis, off-loading of EPDCCH resources is possible. Also, it is possible to configure a PDSCH set that is comprised of a plurality of reduced bandwidths (for example, 1.4 MHz), and, when operations to achieve off-loading and frequency diversity are carried out, link this PDSCH set with an EPDCCH set, so that, by reporting EPDCCH configuration information alone to UEs, the PDSCH set can be reported implicitly as well.

<Method 2>

In method 2 according to the first embodiment, a UE acquires EPDCCH configuration information for USS based on the MIB.

Figure 5A:
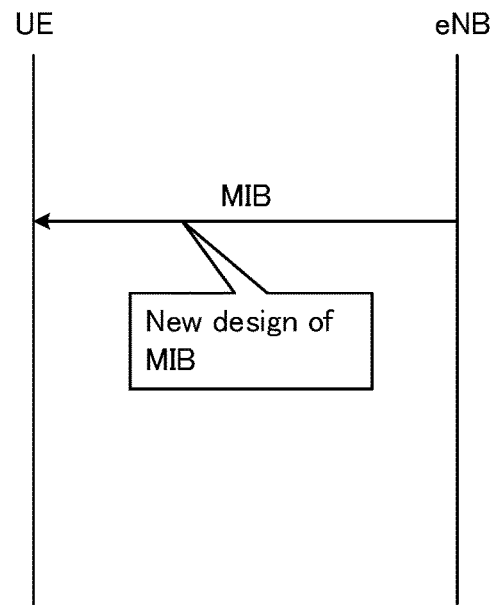
FIG. 5 provide diagrams to show examples of EPDCCH configuration information according to method 2 of the first embodiment.

FIG. 5 provide diagrams to show examples of EPDCCH configuration information according to method 2 of the first embodiment. FIG. 5A is a diagram to show an EPDCCH configuration information report that is sent by using the MIB. As shown in FIG. 5A, in method 2, partial EPDCCH configuration information is reported in a portion of the MIB.

Figure 5B:
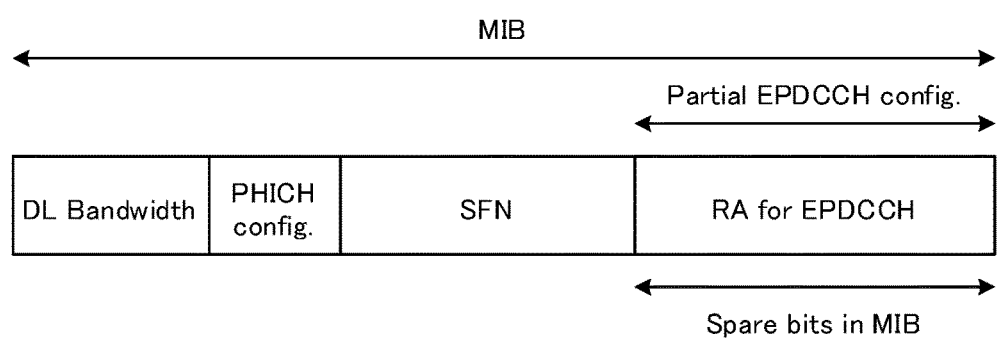

FIG. 5B shows an example of EPDCCH configuration information included in the MIB. The MIB can carry only limited information, and therefore can be structured to contain partial EPDCCH configuration information. The MIB contains important information such as system frame numbers (SFNs), but some bits are not used as spare bits. According to method 2, partial EPDCCH configuration information is reported by using part or all of the spare bits. FIG. 5B shows a case where resource assignment (RA) is included in partial EPDCCH configuration information, but the partial EPDCCH configuration information (or the combination of partial EPDCCH configuration information) to be included in DCI is by no means limited to this.

Note that a structure may be employed here in which the rest of the EPDCCH configuration information that is not configured in the MIB is configured in advance. Furthermore, as for the MIB, the MIB of existing systems may be used, the MIB of existing systems may be enhanced for use, or a new MIB for dedicated use for MTC terminals may be set forth for use.

As described above, according to method 2, the MIB can be detected by all UEs, and therefore a UE can easily acquire EPDCCH configuration information for USS.

<Method 3>

In method 3 according to the first embodiment, a UE acquires EPDCCH configuration information for USS based on an SIB.

Figure 6A:
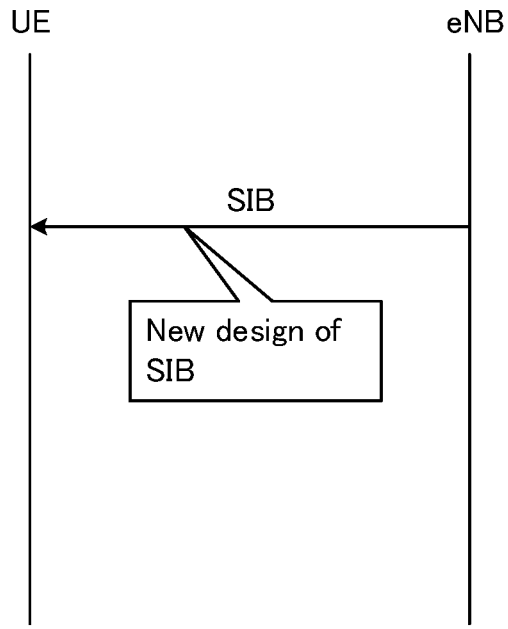
FIG. 6 provide diagrams to show examples of EPDCCH configuration information according to method 3 of the first embodiment.

FIG. 6 provide diagrams to show examples of EPDCCH configuration information according to method 3 of the first embodiment. FIG. 6A is a diagram to show an EPDCCH configuration information report that is sent by using an SIB. As shown in FIG. 6A, in method 3, all or partial EPDCCH configuration information is reported in an SIB.

Figure 6B:
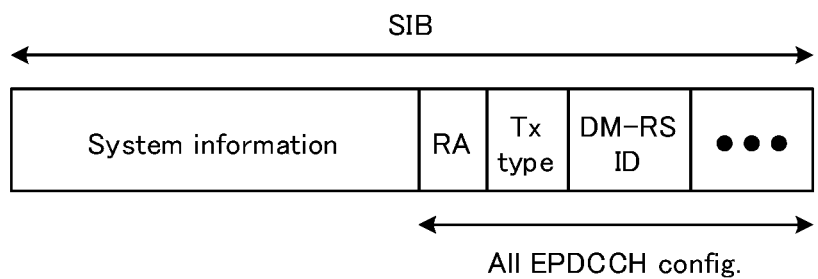
Figure 6C:
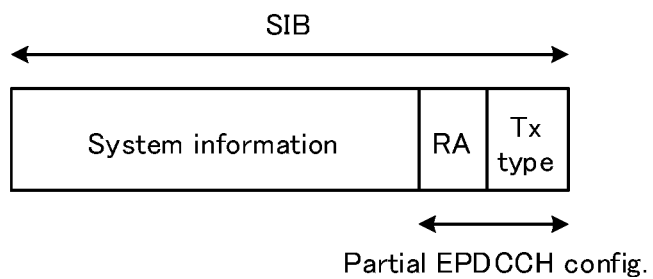

FIG. 6B and FIG. 6C each show an example of EPDCCH configuration information included in an SIB. An SIB may be structured to contain all EPDCCH configuration information (all EPDCCH config.) in addition to system information (FIG. 6B), or may be structured to contain partial EPDCCH configuration information (partial EPDCCH config.) (FIG. 6C).

Note that a structure may be employed here in which the rest of the EPDCCH configuration information that is not configured in an SIB is configured in advance. Furthermore, as an SIB, it is possible to use an SIB of existing systems, enhance an SIB of existing systems for use, or define a new SIB for dedicated use for MTC terminals.

As described above, according to method 3, the SIB can be detected by all UEs that have detected the MIB, and therefore a UE can easily acquire EPDCCH configuration information for USS.

<Method 4>

In method 4 according to the first embodiment, a UE acquires EPDCCH configuration information for USS based on message 2 ("Msg. 2," "random access response," etc.) that is reported in the random access procedure. Although message 2 is transmitted, for example, in the CSS in an EPDCCH, by using an RA-RNTI (Random Access RNTI), a UE can identify the RA-RNTI based on the time/frequency resources in which message 1 ("Msg. 1," "random access preamble," etc.) was transmitted, and therefore can decode the PDSCH in which message 2 is transmitted.

Figure 7A:
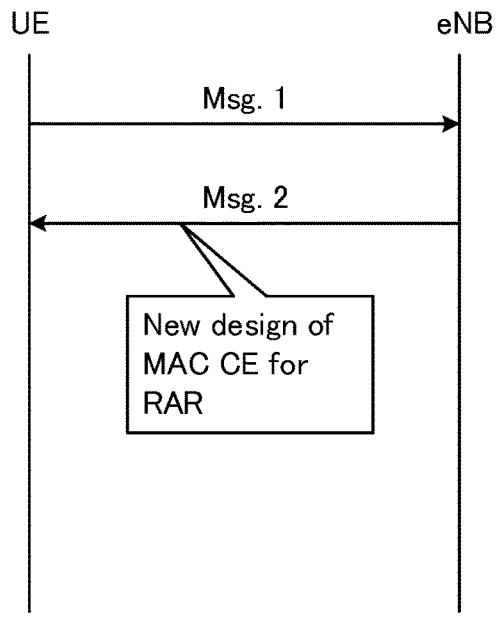
FIG. 7 provide diagrams to show examples of EPDCCH configuration information according to method 4 of the first embodiment.

FIG. 7 provide diagrams to show examples of EPDCCH configuration information according to method 4 of the first embodiment. FIG. 7A is a diagram to show an EPDCCH configuration information report that is sent by using message 2. As shown in FIG. 7A, according to method 4, all or partial EPDCCH configuration information is reported in message 2.

Figure 7B:
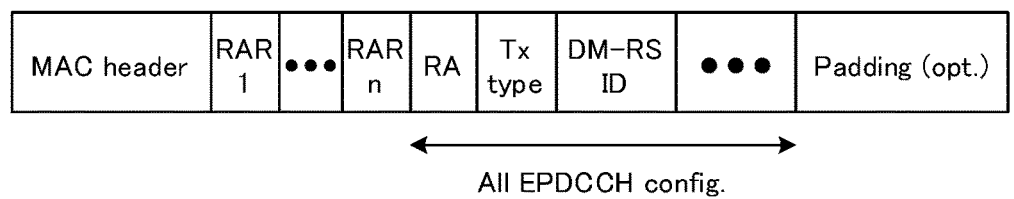
Figure 7C:
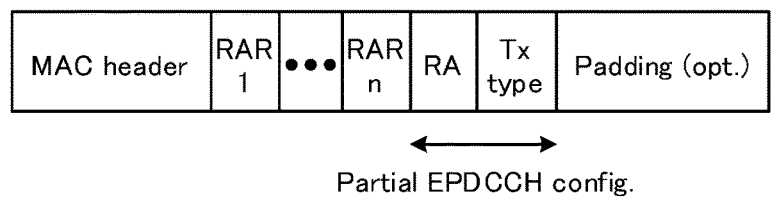

FIG. 7B and FIG. 7C each show an example of EPDCCH configuration information that is included in message 2. Message 2 is formed with MAC CEs (Medium Access Control Control Elements). Message 2 may be structured to contain, in addition to a MAC header and one or more RARs (Random Access Responses), all EPDCCH configuration information (all EPDCCH config.) (FIG. 7B), or partial EPDCCH configuration information (partial EPDCCH config.) (FIG. 7C). Furthermore, message 2 may contain padding bits if necessary.

Note that a structure may be employed here in which the rest of the EPDCCH configuration information that is not configured in message 2 is configured in advance.

As described above, according to method 4, message 2 can be detected by all UEs that have transmitted random access preambles, and therefore a UE can easily acquire EPDCCH configuration information for USS.

<Method 5>

In method 5 according to the first embodiment, a UE acquires EPDCCH configuration information for USS in message 4 ("Msg. 4," "contention resolution," etc.) that is reported in the random access procedure. Although message 4 is transmitted, for example, in the CSS of an EPDCCH, by using a C-RNTI or a TC-RNTI (Temporary C-RNTI), a UE knows the C-RNTI or the TC-RNTI, and therefore can decode the PDSCH in which message 4 is transmitted.

Figure 8A:
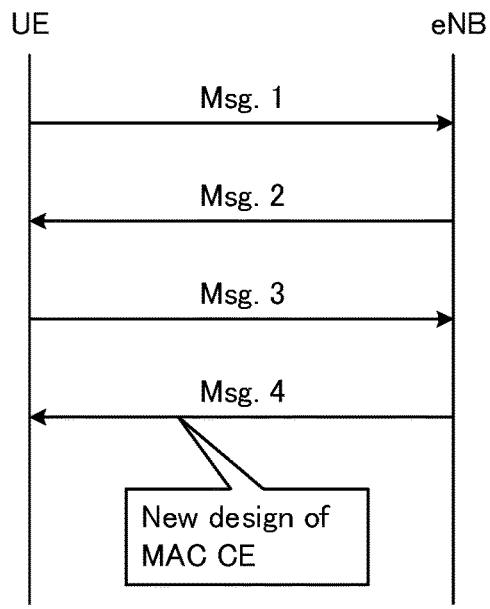
FIG. 8 provide diagrams to show examples of EPDCCH configuration information according to method 5 of the first embodiment.

FIG. 8 provide diagrams to show examples of EPDCCH configuration information according to method 5 of the first embodiment. FIG. 8A is a diagram to show an EPDCCH configuration information report that is sent by using message 4. As shown in FIG. 8A, according to method 5, all or partial EPDCCH configuration information is reported in message 4.

Figure 8B:
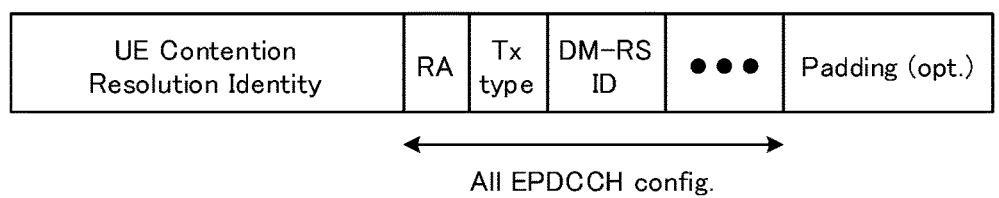
Figure 8C:
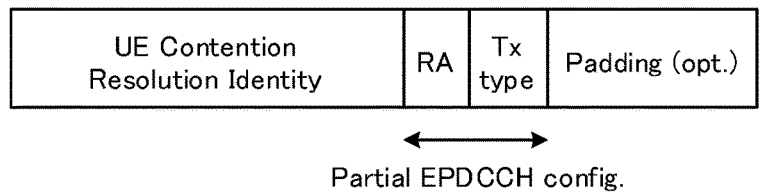

FIG. 8B and FIG. 8C each show an example of EPDCCH configuration information that is included in message 4. Message 4 is formed with MAC CEs, but the MAC header is not illustrated here. Message 4 may be structured to contain, in addition to information related to contention resolution (UE contention resolution identity), all EPDCCH configuration information (all EPDCCH config.) (FIG. 8B), or partial EPDCCH configuration information (partial EPDCCH config.) (FIG. 8C). Furthermore, message 4 may contain padding bits if necessary.

Note that a structure may be employed here in which the rest of the EPDCCH configuration information that is not configured in message 4 is configured in advance.

As described above, according to method 5, message 4 can be detected by all UEs that have transmitted message 3 ("Msg. 3," "RRC connection request," etc.), and therefore a UE can easily acquire EPDCCH configuration information for USS.

<Method 6>

In method 6 according to the first embodiment, a UE acquires EPDCCH configuration information for USS based on predetermined RRC signaling. In the UE, information about the radio resources and the transmission format in which this predetermined RRC signaling is transmitted is configured in advance. That is, this predetermined RRC signaling is transmitted using fixed radio resources and a fixed transmission format.

Figure 9A:
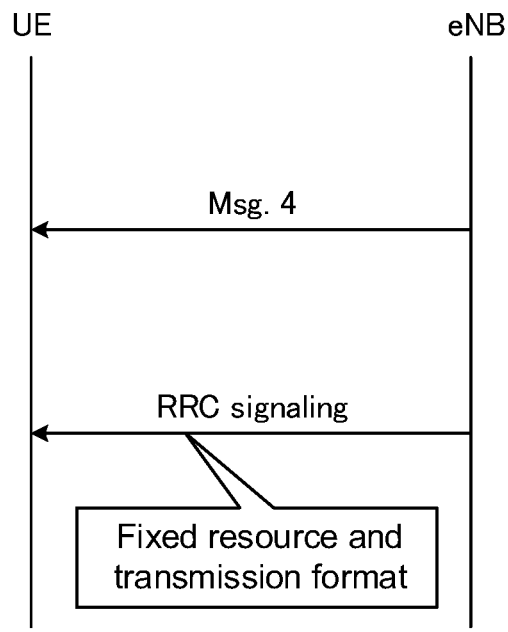
FIG. 9 provide diagrams to show examples of EPDCCH configuration information according to method 6 of the first embodiment.

FIG. 9 provide diagrams to show examples of EPDCCH configuration information according to method 6 of the first embodiment. FIG. 9A is a diagram to show an EPDCCH configuration information report that is reported by using predetermined RRC signaling. As shown in FIG. 9A, in method 6, all or partial EPDCCH configuration information is reported in predetermined RRC signaling.

Figure 9B:
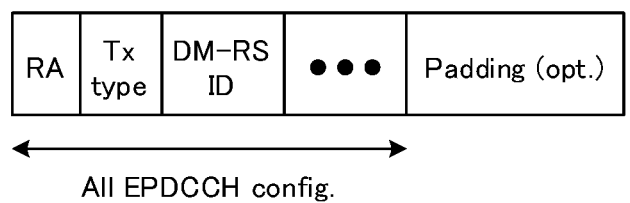
Figure 9C:
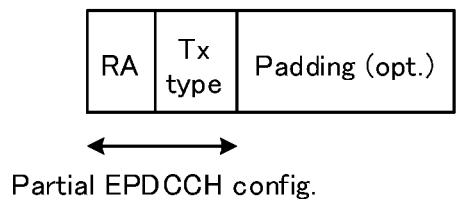

FIG. 9B and FIG. 9C each show an example of EPDCCH configuration information that is included in predetermined RRC signaling. The predetermined RRC signaling may be structured to contain all EPDCCH configuration information (all EPDCCH config.) (FIG. 9B), or may be structured to contain partial EPDCCH configuration information (partial EPDCCH config.) (FIG. 9C). Furthermore, the predetermined RRC signaling may contain padding bits if necessary.

Note that a structure may be employed here in which the rest of the EPDCCH configuration information that is not configured in the predetermined RRC signaling is configured in advance.

As described above, according to method 6, a UE can easily acquire EPDCCH configuration information for USS by means of RRC signaling that uses fixed radio resources and a fixed transmission format.

According to the first embodiment described above, a radio base station can report EPDCCH configuration information for USS to MTC terminals explicitly, without using an existing PDCCH, so that the allocation of an EPDCCH can be controlled flexibly.

Note that the radio base station should preferably be able to change the EPDCCH configuration information to report, among methods 1 to 6, as appropriate (for example, depending on the number of connecting user terminals and/or the like). FIG. 10 is a diagram to show an example of the amount of information that is needed to report EPDCCH configuration information. EPDCCH configuration information that includes all of these pieces of information becomes 29 to 63 bits in total. On the other hand, the amount of information may be reduced by including only part of these pieces of information as EPDCCH configuration information. For example, EPDCCH configuration information that includes only the information of RB assignment is 4 to 38 bits. In this way, adjusting (adding, removing and so on) the EPDCCH configuration information to report, it is possible to keep the scheduling free, and reduce the decrease of throughput.

Second Embodiment

A method to allow a radio base station (eNB) and/or an MTC terminal (UE) to identify EPDCCH configuration information for USS implicitly, without using existing PDCCH-based reporting, will be described with a second embodiment the present invention.

<ID-Based>

According to the second embodiment, a UE can acquire EPDCCH configuration information for USS based on predetermined identifiers (ID). To be more specific, in an example of the second embodiment, part or all of EPDCCH configuration information is linked with predetermined identifiers. These predetermined identifiers may be, for example, cell IDs (physical cell IDs, virtual cell IDs and so on), UEIDs, RNTIs (for example, C-RNTIs) and so on, and these can be reported from radio base stations to UEs.

Figure 11:
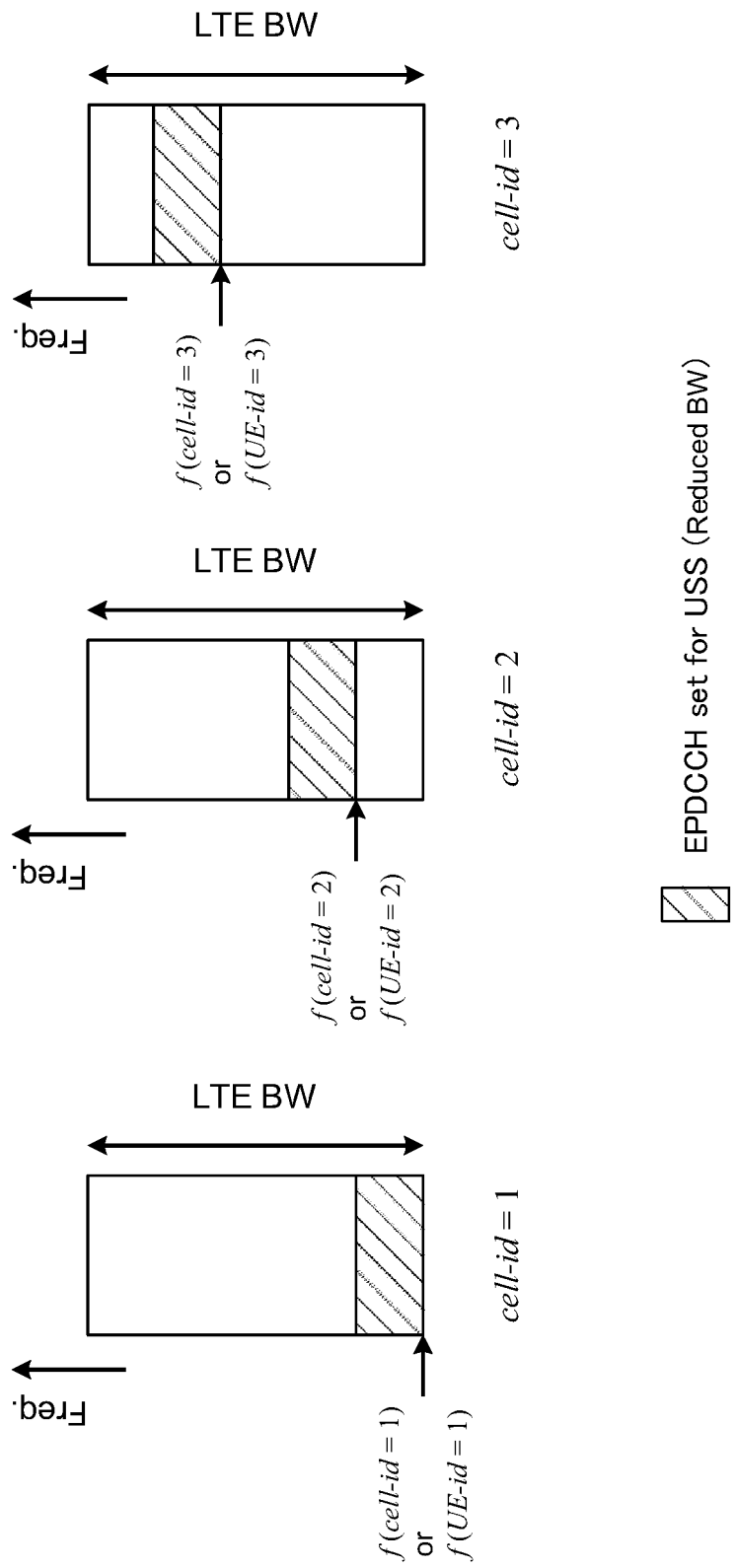
FIG. 11 is a diagram to show an example of an ID-based EPDCCH configuration information acquiring method according to a second embodiment.

FIG. 11 is a diagram to show an example of an ID-based EPDCCH configuration information acquiring method according to the second embodiment. In FIG. 11, in the EPDCCH configuration information, the resource allocation of the EPDCCH set for USS is calculated based on the cell ID or the UEID. To be more specific, the index of the RB or the index of the reduced bandwidth where the resources start is calculated. This can be calculated based on, for example, a function f of the cell ID (cell-id) or the UEID (UE-id).

FIG. 11 in each case of cell ID=1, cell ID=2 and cell ID=3, an EPDCCH is specified in a different resource location. In FIG. 11, the frequency where the EPDCCH resources for USS start in the cell of cell ID=1 is specified by function f of cell ID=1.

Note that information about the linkages between predetermined EPDCCH configuration information and predetermined identifiers (for example, function f) may be reported from the radio base station in the MIB and/or SIBs, or may be set forth in advance.

Furthermore, a UE may be structured to select an EPDCCH USS from a plurality of plurality of candidate reduced bandwidths, based on a predetermined identifier. For example, a plurality of candidate reduced bandwidths for allocating EPDCCH USSs may be reported from a radio base station to a UE by using the MIB, an SIB, and so on, and the UE can select one reduced bandwidth from these candidates based on a predetermined identifier, and use this reduced bandwidth as its EPDCCH USS. Note that the number of EPDCCHs (the number of EPDCCH sets) included in a USS may be reported in the MIB and SIB.

Furthermore, a UE may be structured to select an EPDCCH USS from a plurality of candidate reduced bandwidths by using a plurality of identifiers. For example, a UE can select a plurality of candidate reduced bandwidths based on a given identifier (for example, a cell ID), and then select one reduced bandwidth from these candidates based on another identifier (for example, a UEID), and use this reduced bandwidth as its EPDCCH USS.

Furthermore, a UE may acquire time information about the allocation of an EPDCCH USS based on a predetermined identifier. For example, information such as the cycle, the subframe number, the subframe offset, the subframe location and so on may be acquired as the time information about the allocation of an EPDCCH USS.

As described above, according to the ID-based EPDCCH configuration information acquiring method according to the second embodiment, a UE can easily acquire EPDCCH configuration information for USS in association with predetermined identifiers.

<PRACH Resource-Based>

According to the second embodiment, a UE can acquire EPDCCH configuration information for USS based on random access channel (PRACH: Physical Random Access Channel) resources. To be more specific, in an example of the second embodiment, part or all of EPDCCH configuration information is linked with PRACH resources. The PRACH resources may be, for example, the frequency resources to transmit the PRACH, preambles transmitted in the PRACH and so on.

Figure 12B:
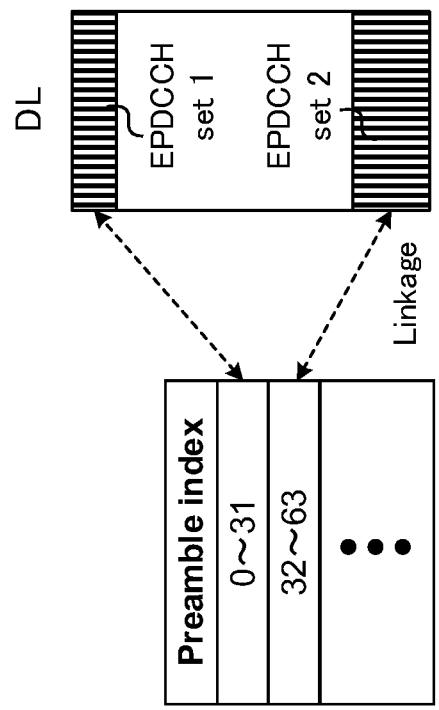
FIG. 12 provide diagrams to show an example of a PRACH resource-based EPDCCH configuration information method according to the second embodiment.
Figure 12A:
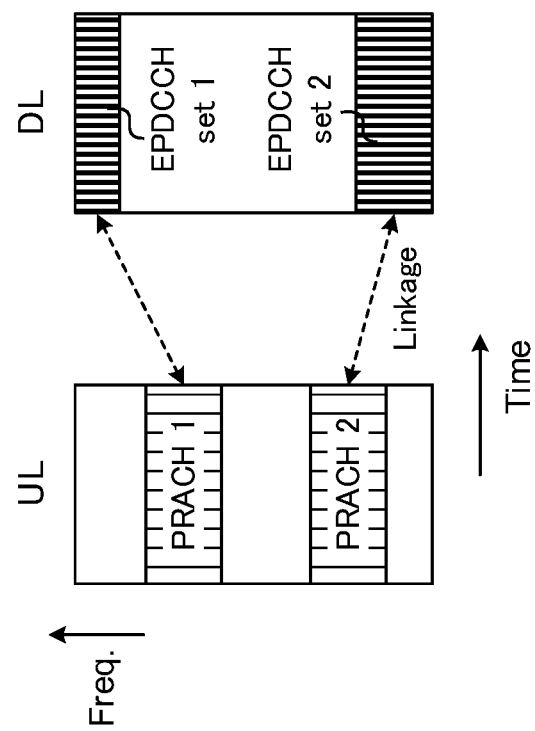

FIG. 12 provide diagrams to show examples of the PRACH resource-based EPDCCH configuration information acquiring method according to the second embodiment. FIG. 12 show an example, in which, in EPDCCH configuration information, the resource allocation of the EPDCCH set for USS is linked with PRACH-transmitting frequency resources (FIG. 12A), and an example in which the resource allocation of the EPDCCH set for USS is linked with preambles that are transmitted in the PRACH (FIG. 12B).

Referring to FIG. 12A, when a UE transmits a PRACH in PRACH 1, the UE can judge that EPDCCH set 1 is the EPDCCH to use. Furthermore, when transmitting a PRACH in PRACH 2, the UE can judge that EPDCCH set 2 is the EPDCCH to use.

Referring to FIG. 12B, when a UE transmits the preambles corresponding to preamble indices 0 to 31 in a PRACH, the UE can judge that EPDCCH set 1 is the EPDCCH to use. Furthermore, when transmitting the preambles corresponding to preamble indices 32 to 63 in a PRACH, the UE can judge that EPDCCH set 2 is the EPDCCH to use.

Note that information about the linkages between predetermined EPDCCH configuration information and PRACH resources (for example, linkages between preamble indices and EPDCCH sets) may be reported from a radio base station to a UE in the MIB and/or an SIB, or may be set forth in advance.

As described above, according to the PRACH-based EPDCCH configuration information acquiring method of the second embodiment, a UE can easily acquire EPDCCH configuration information for USS in association with PRACH.

(Variation)

The method of transmitting DCI in the CSS in an EPDCCH (eCSS) has been described with the first embodiment (method 1). Here, the present inventors have found out a new problem with the use of an eCSS. To be more specific, the present inventors have found out that, when a high aggregation level (AL) is used for an eCSS as for a conventional CSS, each UE shares the same blind decoding candidate in a reduced bandwidth, and, consequently, the blocking rate of DCI increases in this eCSS.

Here, the blocking of DCI means that, when an attempt is made to allocate a plurality of DCIs in the same search space (the same resource), some of the DCIs are blocked from being allocated. When the blocking rate is high, the time it takes a UE to receive proper control signals (the active time to try blind decoding) becomes longer, which then results in increased power consumption. Furthermore, when the blocking rate is high, the spectral efficiency on the network end decreases.

Figure 13:
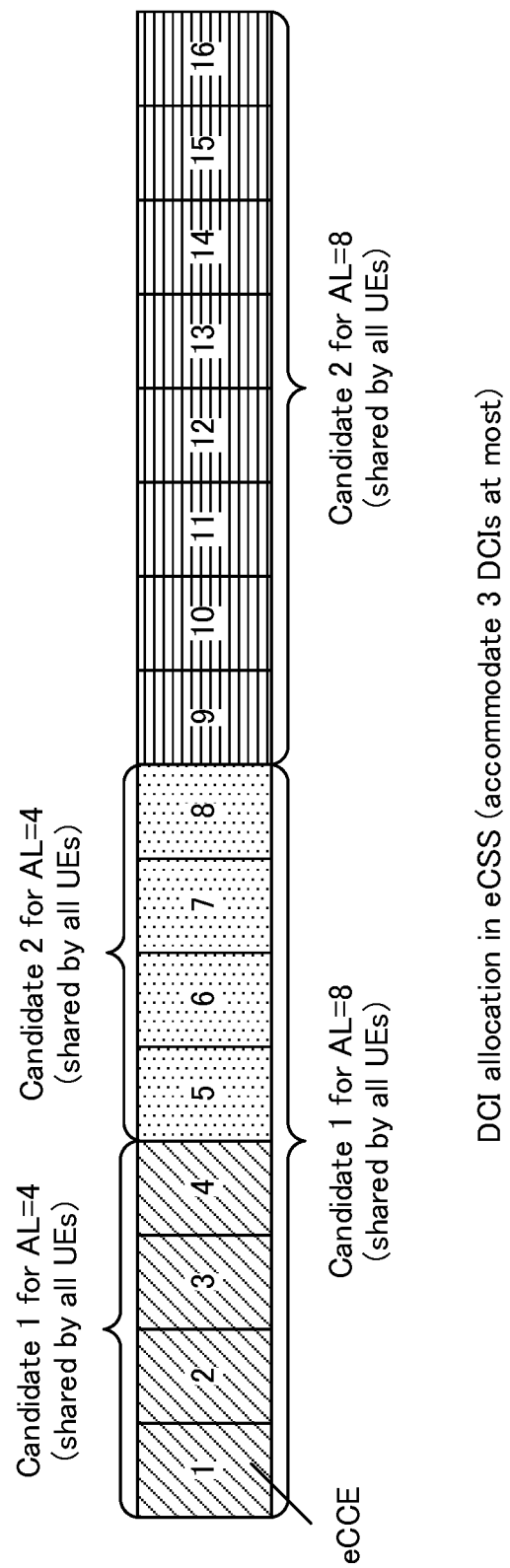
FIG. 13 is a diagram to show an example of DCI allocation in an eCSS accommodating maximum 3 DCIs.

FIG. 13 is a diagram to show an example of DCI allocation in an eCSS accommodating maximum 3 DCIs. FIG. 13 shows a case where there are two candidates for eCSSs (candidate 1 and candidate 2), and where two ALs (AL=4 and 8) are applicable to each candidate. Each candidate's AL are share by all UE s (can be detected by all UEs). Note that an eCSS is formed by using eCCEs (enhanced Control Channel Elements).

For example, if a radio base station tries to allocate candidate 1 of AL=8 preferentially, candidate 2 of AL=4 is blocked, and cannot be allocated. Furthermore, if, on the other hand, radio base station tries to allocate candidate 2 of AL=4 preferentially, candidate 1 of AL=8 is blocked, and cannot be allocated.

Meanwhile, the present inventors have focused on the point that the DCI in an eCSS may be scrambled by using a C-RNTI with method 1 of the first embodiment. That is, according to method 1, even if all user terminals receive the same eCSS, only limited users can decode this eCSS, and so there is little advantage to transmitting eCSSs in fixed frequency locations and by applying high aggregation levels.

Based on the above points of focus, the present inventors have conceived of transmitting candidates for eCSSs for specific user terminals in varying frequency locations and by applying relatively low aggregation levels, just as is the case with USSs, and have arrived at a variation of the present invention.

According to the variation of the present invention, a candidate for an eCSS for a specific user terminal is calculated by using the C-RNTI pertaining to this user terminal and a hash function, which is a randomizing function. For the hash function, it may be possible to use a hash function that is applied to USSs in existing systems, modify a hash function of existing systems for use, or define a new hash function for dedicated use for MTC terminals.

Figure 14:
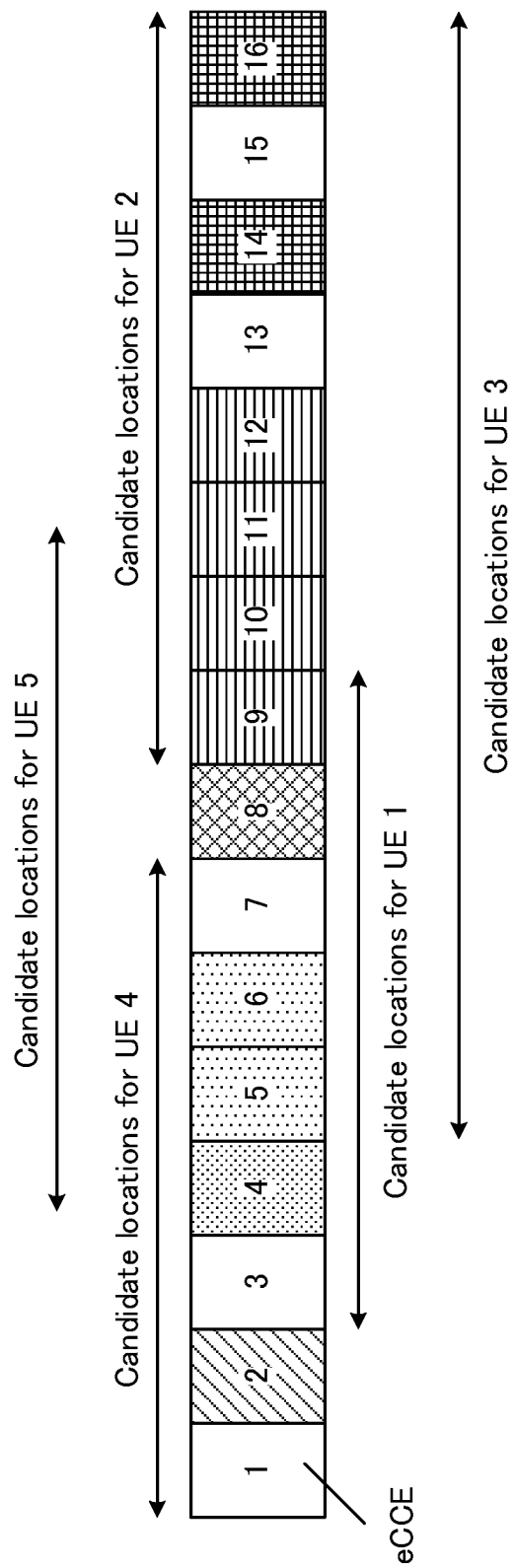
FIG. 14 is a diagram to show an example of DCI allocation in an eCSS according to a variation of the present invention.

FIG. 14 is a diagram to show an example of DCI allocation in an eCSS according to a variation of the present invention. In FIG. 14, each user terminal (UE) searches a different candidate eCSS location. Furthermore, in each candidate eCSS location, the DCI for each UE is scrambled by a unique C-RNTI and reported. Here, each DCI's ALs are not limited to 4 or 8, and can be smaller values (for example, 1, 2 and so on). Furthermore, by using a hash function, it is possible to randomize the location to allocate each DCI.

As described above, according to the configuration of a variation of the present invention, an eCSS is allocated in a different method than conventional CSS allocation, so that it is possible to reduce the increase of the blocking rate when reduced bandwidths are used.

(Radio Communication System)

Now, the structure of the radio communication system according to an embodiment of the present invention will be described below. In this radio communication system, the radio communication methods according to the above-described embodiments of the present invention are employed. Note that the radio communication methods of the above-described embodiments may be applied individually or may be applied in combination. Here, although MTC terminals will be shown as examples of user terminals in which the bandwidth to use is limited to reduced bandwidths, the present invention is by no means limited to MTC terminals.

Figure 15:
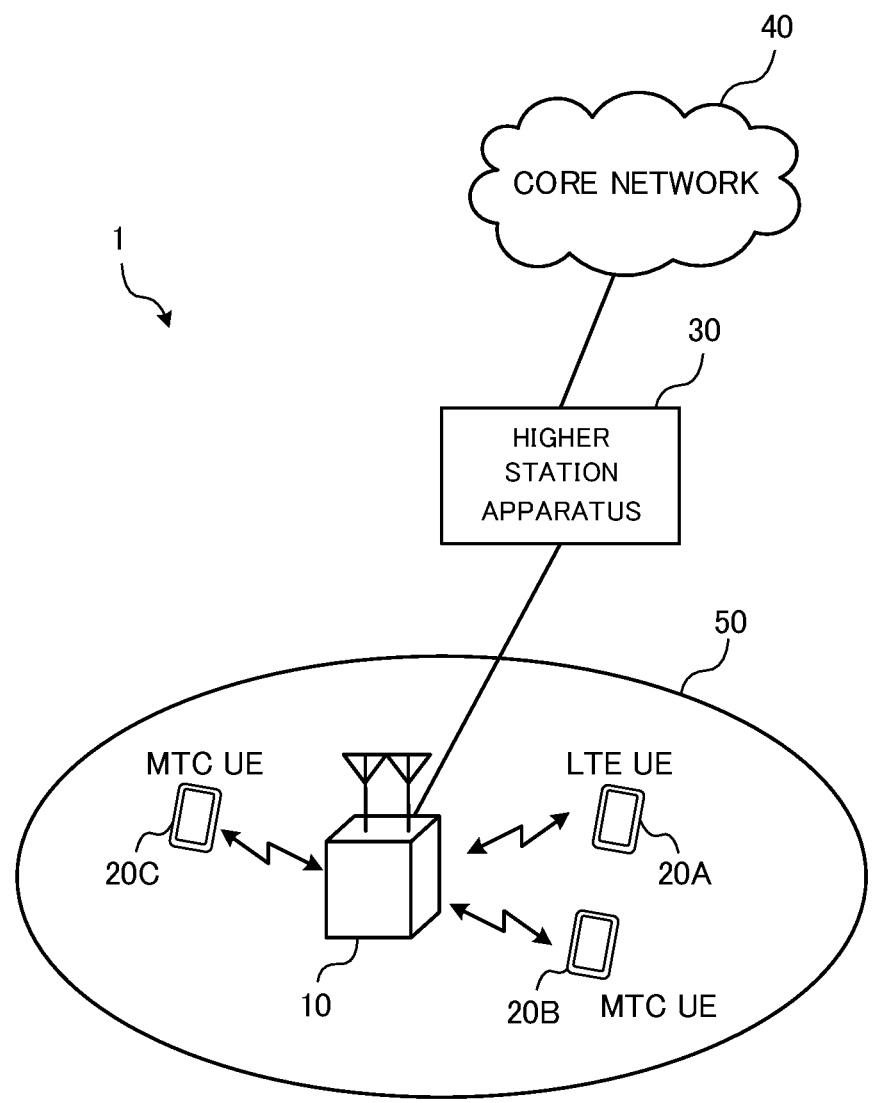
FIG. 15 is a diagram to show a schematic structure of a radio communication system according to an embodiment of the present invention.

FIG. 15 is a diagram to show a schematic structure of the radio communication system according to an embodiment of the present invention. The radio communication system 1 shown in FIG. 15 is an example of employing an LTE system in the network domain of a machine communication system. The radio communication system 1 can adopt carrier aggregation (CA) and/or dual connectivity (DC) to group a plurality of fundamental frequency blocks (component carriers) into one, where the LTE system bandwidth constitutes one unit. Also, although, in this LTE system, the system bandwidth is configured to maximum 20 MHz in both the downlink and the uplink, this configuration is by no means limiting. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are MTC terminals that serve as communication devices in machine communication systems. Hereinafter the user terminals 20A, 20B and 20C will be simply referred to as "user terminals 20," unless specified otherwise.

Note that the MTC terminals 20B and 20C are terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals directly, or communicate with other user terminals via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bands (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles for establishing connections with cells are communicated.

<Radio Base Station>

Figure 16:
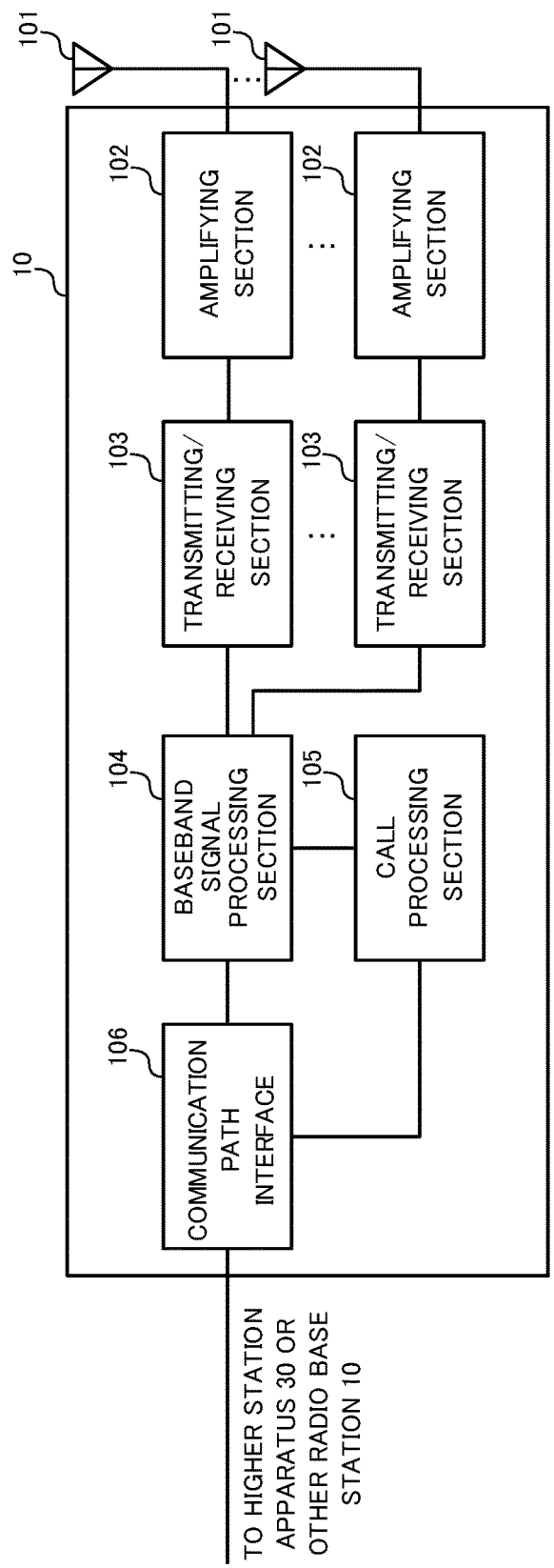
FIG. 16 is a diagram to show an example of an overall structure of a radio base station according to an embodiment of the present invention.

FIG. 16 is a diagram to show an example of an overall structure of a radio base station according to one embodiment of the present invention.

A radio base station 10 has a plurality of transmitting/receiving antennas 101, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency bandwidth. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and/or receive various signals in a reduced bandwidth (for example, 1.4 MHz) that is more limited than a system bandwidth (for example, one component carrier).

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

Note that the transmitting/receiving sections 103 transmits predetermined information, which is generated in transmission signal generating section 302 (described later), to the user terminals 20, without using the PDCCH.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 17:
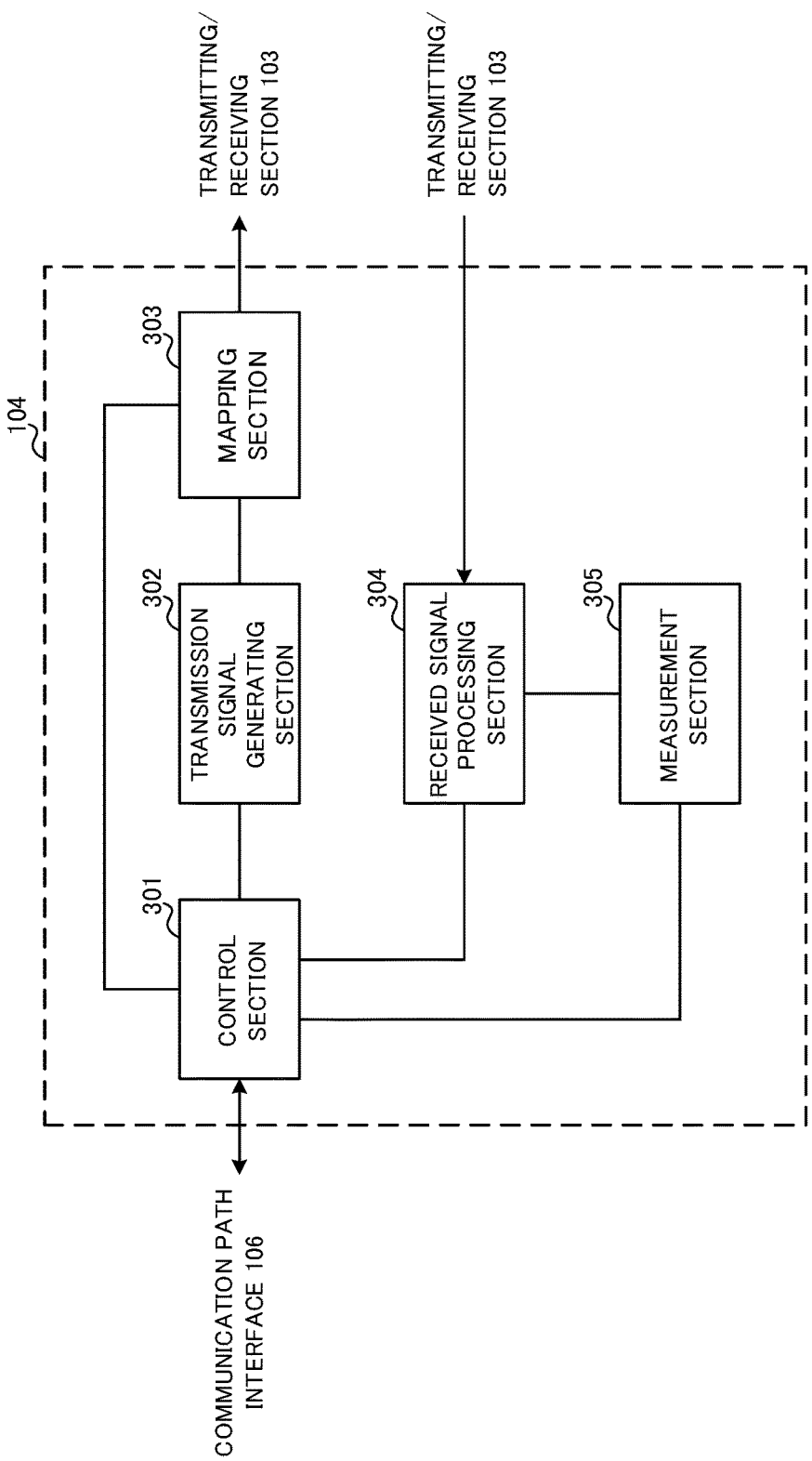
FIG. 17 is a diagram to show an example of a functional structure of a radio base station according to one embodiment of the present invention.

FIG. 17 is a diagram to show an example of a functional structure of a radio base station according to the present embodiment. Note that, although FIG. 17 primarily shows functional blocks that pertain to characteristic parts of the present embodiment, the radio base station 10 has other functional blocks that are necessary for radio communication as well. As shown in FIG. 17, the baseband signal processing section 104 has a control section (scheduler) 301, a transmission signal generating section (generation section) 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. Also, the control section 301 controls the scheduling of synchronization signals, and downlink reference signals such as CRSs (Cell-specific Reference Signals), CSI-RSs (Channel State Information Reference Signals), DM-RSs (Demodulation Reference Signals) and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 controls the transmission signal generating section 302 and the mapping section 303 to allocate various signals to reduced bandwidths and transmit these to the user terminals 20. For example, the control section 301 controls downlink system information (the MIB, SIBs, etc.), EPDCCHs, PDSCHs and so on, to be transmitted in reduced bandwidths.

Furthermore, the control section 301 exerts control so that predetermined information, which the user terminals 20 use to acquire EPDCCH configuration information, is transmitted to the user terminals 20. Here, the predetermined information may be DCI (method 1), the MIB (method 2), an SIB (method 3), Msg. 2 (method 4), Msg. 4 (method 5), RRC signaling (method 6), a predetermined identifier (and/or information related to the linkages between predetermined identifiers and predetermined EPDCCH configuration information) (second embodiment, ID-based), information related to the linkages between PRACH resources and predetermined EPDCCH configuration information (second embodiment, PRACH resource-based), and so on.

Furthermore, the control section 301 exerts control so that an EPDCCH for a user terminal 20 is transmitted in an EPDCCH USS that can be detected in the user terminal 20 by using the above EPDCCH configuration information. Note that the EPDCCH configuration information may include EPDCCH configuration information for dedicated use for MTC terminals (for example, information about frequency hopping, the number of times to repeat transmission and so on, with respect to EPDCCH).

The transmission signal generating section (generation section) 302 generates downlink signals based on commands from the control section 301 and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI: Channel State Information) reported from each user terminal. Furthermore, the transmission signal generating section 302 generates the above-mentioned predetermined information.

The mapping section 303 maps the downlink signals generated in the transmission signal generating section 302 to predetermined reduced bandwidth radio resources (for example, maximum 6 resource blocks) based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, and so on). For the received signal processing section 304, a signal processor, a signal processing circuit or a signal processing device that can be described based on common understanding of the technical field to which the present invention pertains can be used.

The received signal processing section 304 outputs the decoded information acquired through the receiving processes to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

<User Terminal>

Figure 18:
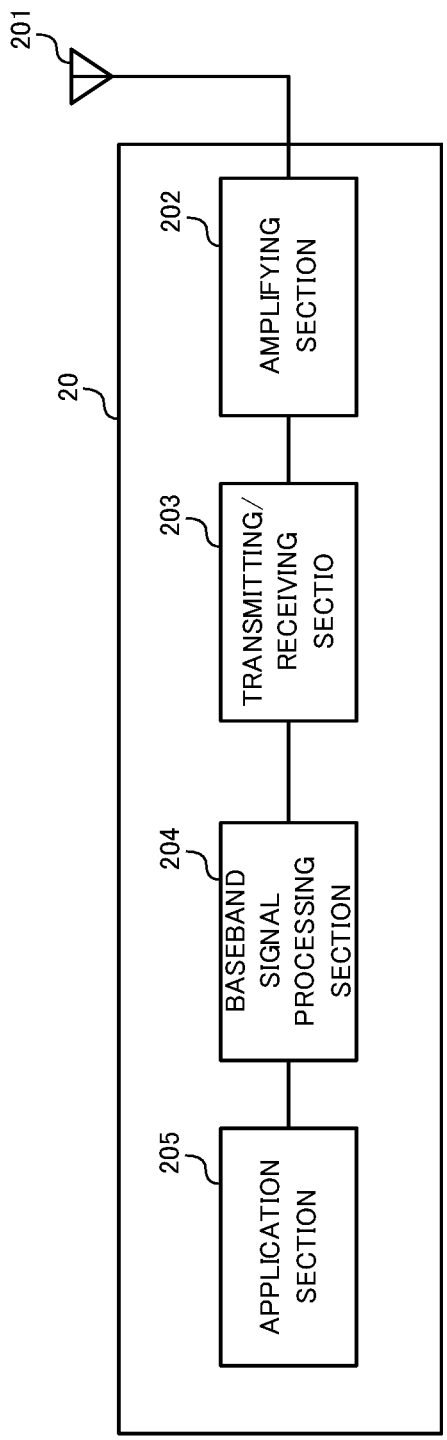
FIG. 18 is a diagram to show an example of an overall structure of a user terminal according to an embodiment of the present invention.

FIG. 18 is a diagram to show an example of an overall structure of a user terminal according to the present embodiment. Note that, although not described in detail herein, normal LTE terminals may operate to act as MTC terminals. A user terminal 20 has a transmitting/receiving antenna 201, an amplifying section 202, a transmitting/receiving section 203, a baseband signal processing section 204 and an application section 205. Also, the user terminal 20 may have a plurality of transmitting/receiving antennas 201, amplifying sections 202, transmitting/receiving sections 203 and/or others.

A radio frequency signal that is received in the transmitting/receiving antenna 201 is amplified in the amplifying section 202. The transmitting/receiving section 203 receives the downlink signal amplified in the amplifying section 202. The received signal is subjected to frequency conversion and converted into the baseband signal in the transmitting/receiving section 203, and output to the baseband signal processing section 204. The transmitting/receiving section 203 can be constituted by a transmitters/receiver, a transmitting/receiving circuit or a transmitting/receiving device that can be described based on common understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving section 203. The radio frequency signal that is subjected to frequency conversion in the transmitting/receiving section 203 is amplified in the amplifying section 202, and transmitted from the transmitting/receiving antenna 201.

Figure 19:
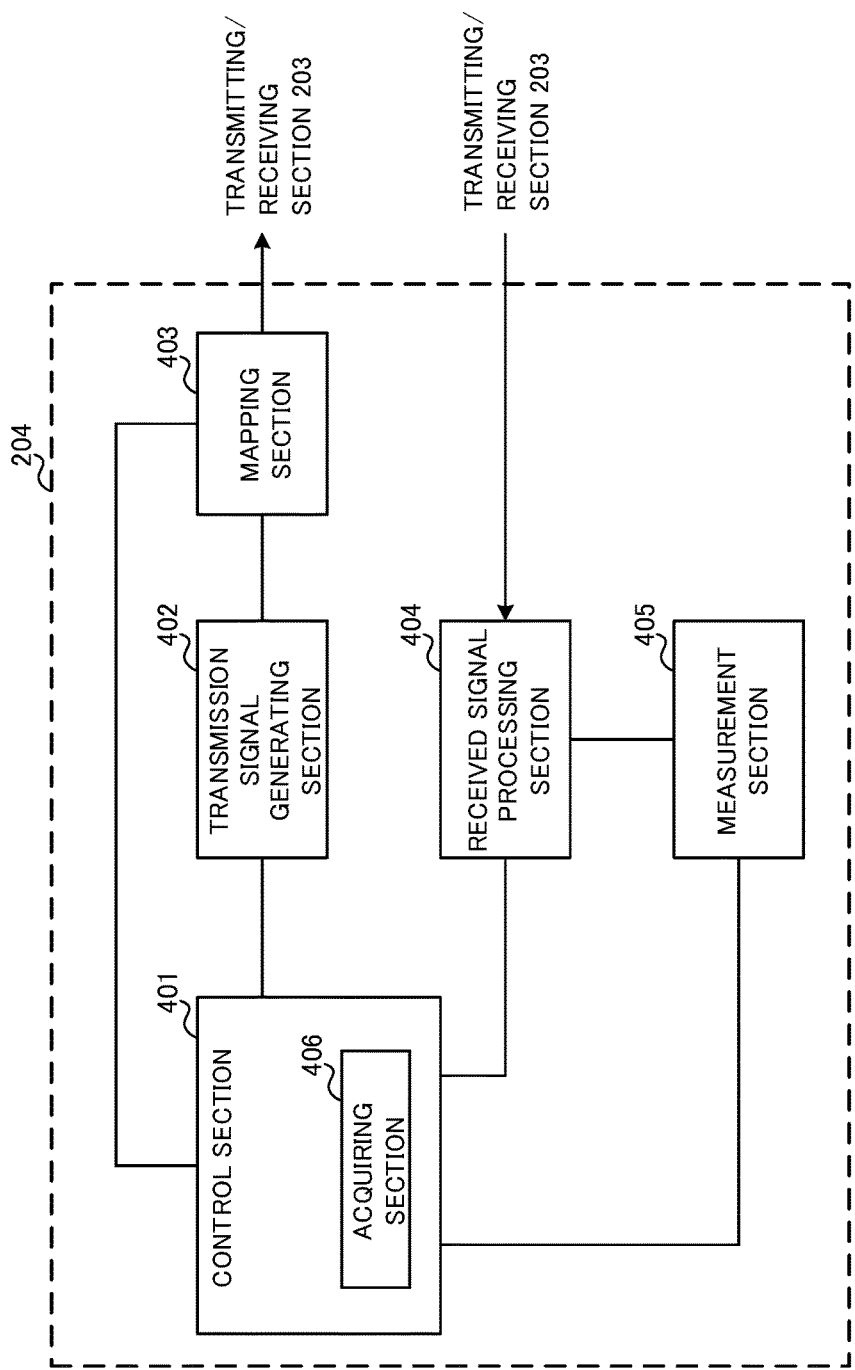
FIG. 19 is a diagram to show an example of a functional structure of a user terminal according to an embodiment of the present invention.

FIG. 19 is a diagram to show an example of a functional structure of a user terminal according to the present embodiment. Note that, although FIG. 19 primarily shows functional blocks that pertain to characteristic parts of the present embodiment, the user terminal 20 has other functional blocks that are necessary for radio communication as well. As shown in FIG. 19, the baseband signal processing section 204 provided in the user terminal 20 has a control section 401, a transmission signal generating section 402, a mapping section 403, a received signal processing section 404, a measurement section 405 and an acquiring section 406.

The control section 401 controls the whole of the user terminal 20. The control section 401 can be constituted by a controller, a control circuit or a control device that can be described based on common understanding of the technical field to which the present invention pertains.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on.

The control section 401 has an acquiring section 406. The acquiring section 406 receives predetermined information, which is reported from the radio base station 10 without using the PDCCH, from the received signal processing section 404, and acquires the EPDCCH configuration information related to the user terminal 20's USS, based on the predetermined information. The EPDCCH configuration information that is acquired may be output from the control section 401 to the received signal processing section 404. Note that the acquiring section 406 may be provided outside the control section 401.

The acquiring section 406 may acquire EPDCCH configuration information based on information that is reported in a predetermined signal format (DCI, MIB, SIB, Msg. 2, Msg. 4, RRC signaling and so on) (first embodiment). Furthermore, the acquiring section 406 may acquire EPDCCH configuration information from predetermined identifiers, PRACH resources and so on, based on rules that are configured in advance, or based on rules that are configured by predetermined reporting (second embodiment).

The transmission signal generating section 402 generates UL signals based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

The mapping section 403 maps the uplink signals generated in the transmission signal generating section 402 to radio resources (maximum 6 resource blocks) based on commands from the control section 401, and outputs these to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains. Also, the received signal processing section 404 can constitute the receiving section according to the present invention.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

Furthermore, the received signal processing section 404 detects an EPDCCH USS based on the EPDCCH configuration information input from the control section 401, decodes the EPDCCH received, and outputs the decoded control information to the control section 401.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. The measurement results may be output to the control section 401.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2015-015163, filed on Jan. 29, 2015, including the specification, drawings and abstract, is incorporated herein by reference in its entirety.

The invention claimed is:

1. A terminal comprising:
   a processor that acquires, from a random access response, configuration information of a Machine-Type Communication (MTC) physical downlink control channel (MPDCCH), which is different from and has reduced bandwidth than a physical downlink control channel (PDCCH), the configuration information including information to indicate a frequency per narrowband; and
   a receiver that monitors a terminal-specific search space (UE-specific Search Space) of the MPDCCH based on the configuration information acquired from the random access response in order to receive signals which cannot be received using the PDCCH,
   wherein the receiver decodes downlink control information with Cyclic Redundancy Code (CRC) scrambled by Cell-Radio Network Temporary Identifier (C-RNTI) in a common search space of the MPDCCH.

2. A radio base station comprising:
   a processor that generates a random access response including configuration information of a Machine-Type Communication (MTC) physical downlink control channel (MPDCCH), which is different from and has reduced bandwidth than a physical downlink control channel (PDCCH), the configuration information including information to indicate a frequency per narrowband; and a transmitter that transmits the random access response, wherein the transmitter transmits downlink control information in a terminal-specific search space (UE-specific Search Space) of the MPDCCH to be monitored based on the configuration information acquired from the random access response in order to transmit signals which cannot be transmitted using the PDCCH, and wherein the transmitter transmits downlink control information with Cyclic Redundancy Code (CRC) scrambled by Cell-Radio Network Temporary Identifier (C-RNTI) in a common search space of the MPDCCH.

3. A radio communication method for a terminal, comprising:

acquiring, from a random access response, configuration information of a Machine-Type Communication (MTC) physical downlink control channel (MPDCCH), which is different from and has reduced bandwidth than a physical downlink control channel (PDCCH), the configuration information including information to indicate a frequency per narrowband; and monitoring a terminal-specific search space (UE-specific Search Space) of the MPDCCH based on the configuration information acquired from the random access response in order to receive signals which cannot be received using the PDCCH, wherein the terminal decodes downlink control information with Cyclic Redundancy Code (CRC) scrambled by Cell-Radio Network Temporary Identifier (C-RNTI) in a common search space of the MPDCCH downlink control channel.

* * * * *